US008370532B1

(12) United States Patent
Gilbert

(10) Patent No.: US 8,370,532 B1
(45) Date of Patent: Feb. 5, 2013

(54) TECHNIQUES FOR PORTABLE DEVICE DATA ARCHIVING

(75) Inventor: Andrew Gilbert, High Wycombe (GB)

(73) Assignee: Symantec Corporation, Mountain View, CA (US)

(*) Notice: Subject to any disclaimer, the term of this patent is extended or adjusted under 35 U.S.C. 154(b) by 338 days.

(21) Appl. No.: 12/606,574

(22) Filed: Oct. 27, 2009

(51) Int. Cl.
*G06F 3/00* (2006.01)
*G06F 13/00* (2006.01)

(52) U.S. Cl. ............... 710/5; 710/8; 710/15; 710/33; 710/36

(58) Field of Classification Search ............... None
See application file for complete search history.

(56) References Cited

U.S. PATENT DOCUMENTS

| | | | | |
|---|---|---|---|---|
| 2007/0294321 | A1* | 12/2007 | Midgley et al. | 707/204 |
| 2009/0307284 | A1* | 12/2009 | Welingkar et al. | 707/204 |
| 2010/0169590 | A1* | 7/2010 | Gordon-Carroll et al. | 711/162 |

OTHER PUBLICATIONS

Clickfree Portable Backup Driver User Guide, 2009, Storage Appliance Corporation, [online, accessed on Nov. 5, 2011], URL: http://www.clickfree.com/downloads/clickfree_manual.pdf.*
Microforensics, "Titan Collector," found at http://www.microforensics.com/pages/software-titan.php; Jan. 8, 2010; 3 pages.
Ferris Research, "Onset's Mobile Device Archiving and Monitoring," found at http://www.ferris.com/2008/09/21/onsets-mobile-device-archiving-and-monitoring/; Jan. 13, 2010; 2 pages.

* cited by examiner

*Primary Examiner* — Scott Sun
(74) *Attorney, Agent, or Firm* — Wilmer Cutler Pickering Hale and Dorr LLP

(57) ABSTRACT

Techniques for portable device data archiving are disclosed. In one particular exemplary embodiment, the techniques may be realized as a computer implemented method for data archiving comprising detecting a connection of a device to a computing platform, identifying the connected device, and archiving data of the connected device according to a specified archive parameter.

19 Claims, 3 Drawing Sheets

US 8,370,532 B1

TECHNIQUES FOR PORTABLE DEVICE DATA ARCHIVING

FIELD OF THE DISCLOSURE

The present disclosure relates generally to data archiving systems and, more particularly, to techniques for portable device data archiving.

BACKGROUND OF THE DISCLOSURE

Data archiving systems are designed to manage and store data for an entity such as a corporation. This information can be sourced from a number of different locations such as, for example, an email server or a file system. However, corporate information may frequently be held on other devices such as, for example, portable devices including flash memory data storage devices, cell phones, and Personal Digital Assistants (PDAs). This data is not discovered by archiving systems and is frequently lost. Archiving data on portable devices requires copying data to a file system such as, for example, a PC or a server, and then archiving the data from the file system. Archiving this data further requires some type of manual configuration to assign the correct archive parameters to the data.

In view of the foregoing, it may be understood that there may be significant problems and shortcomings associated with current techniques for archiving data.

SUMMARY OF THE DISCLOSURE

Techniques for portable device data archiving are disclosed. In one particular exemplary embodiment, the techniques may be realized as a computer implemented method for data archiving comprising detecting a connection of a device to a computing platform, identifying the connected device, and archiving data of the connected device according to a specified archive parameter.

In accordance with other aspects of this particular exemplary embodiment, identifying the connected device may comprise prompting a user for device identification and one or more archive parameters.

In accordance with further aspects of this particular exemplary embodiment, prompting a user for device identification and one or more archive parameters may comprise providing a graphical user interface guiding a user through entry of archive information for the connected device.

In accordance with additional aspects of this particular exemplary embodiment, identifying the connected device may comprise using an identifier stored on the connected device.

In accordance with additional aspects of this particular exemplary embodiment, the identifier may be stored on the connected device prior to distribution to a user.

In accordance with additional aspects of this particular exemplary embodiment, the identifier may comprise at least one of: a Plug and Play Device ID associated with the connected device, a volume serial number associated with the connected device, a PIN associated with the connected device, a Media Access Control (MAC) address, and an administrator assigned unique identifier.

In accordance with additional aspects of this particular exemplary embodiment, the specified archive parameter may comprise at least one of: a specified archive repository, a retention category, an indication of one or more portions of a connected device to be archived, an archive policy indicator, a keyword to be associated with archived data, a tag to be associated with archived data, a checksum associated with data previously archived, and a hash value associated with data previously archived.

In accordance with additional aspects of this particular exemplary embodiment, the specified archive parameter may comprise a default archive parameter.

In accordance with additional aspects of this particular exemplary embodiment, detecting connection of a device to a computing platform may be performed at least in part using at least one architecture of the computing platform comprising: a hot-pluggable architecture, a plug and play architecture, a hot swappable architecture, a universal plug and play architecture, and a Hardware Abstraction Layer (HAL).

In accordance with additional aspects of this particular exemplary embodiment, the connected device connection may comprise at least one of: a Universal Serial Bus (USB) connection, a firewire connection, a wireless connection, Bluetooth connection, a memory card interface, and a storage media interface.

In accordance with additional aspects of this particular exemplary embodiment, the connected device may comprise at least one of: a digital camera, a cellular phone, a flash memory device, a game device, a Personal Digital Assistant (PDA), a portable media player, an e-book reader, storage media, and an external storage device.

In accordance with additional aspects of this particular exemplary embodiment, detecting a connection of a device to a computing platform may comprise detection of a networked device using universal plug and play.

In accordance with additional aspects of this particular exemplary embodiment, the computing platform may comprise a broadband router.

In accordance with additional aspects of this particular exemplary embodiment, the specified archive parameter may be stored on the connected device.

In accordance with additional aspects of this particular exemplary embodiment, the specified archive parameter may be stored on a central network accessible location and associated with an identifier of the connected device.

In accordance with additional aspects of this particular exemplary embodiment, identifying the connected device may comprise determining whether the connected device contains an identifier.

In accordance with additional aspects of this particular exemplary embodiment, portable device data archiving may comprise skipping archival of data of the connected device in the event the connected device does not contain the identifier.

In accordance with additional aspects of this particular exemplary embodiment, portable device data archiving may be realized as at least one processor readable storage medium for storing a computer program of instructions configured to be readable by at least one processor for instructing the at least one processor to execute a computer process for performing a method as described above.

In another particular exemplary embodiment, the techniques may be realized as an article of manufacture for data archiving, the article of manufacture comprising at least one processor readable storage medium, and instructions carried on the at least one storage medium, wherein the instructions are configured to be readable from the at least one medium by at least one processor and thereby cause the at least one processor to operate so as to detect a connection of a device to a computing platform, identify the connected device, and archive data of the connected device according to a specified archive parameter.

In yet another particular exemplary embodiment, the techniques may be realized as a system for data archiving comprising one or more processors communicatively coupled to a network, wherein the one or more processors are configured to detect a connection of a device to a computing platform, identify the connected device, and archive data of the connected device according to a specified archive parameter.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
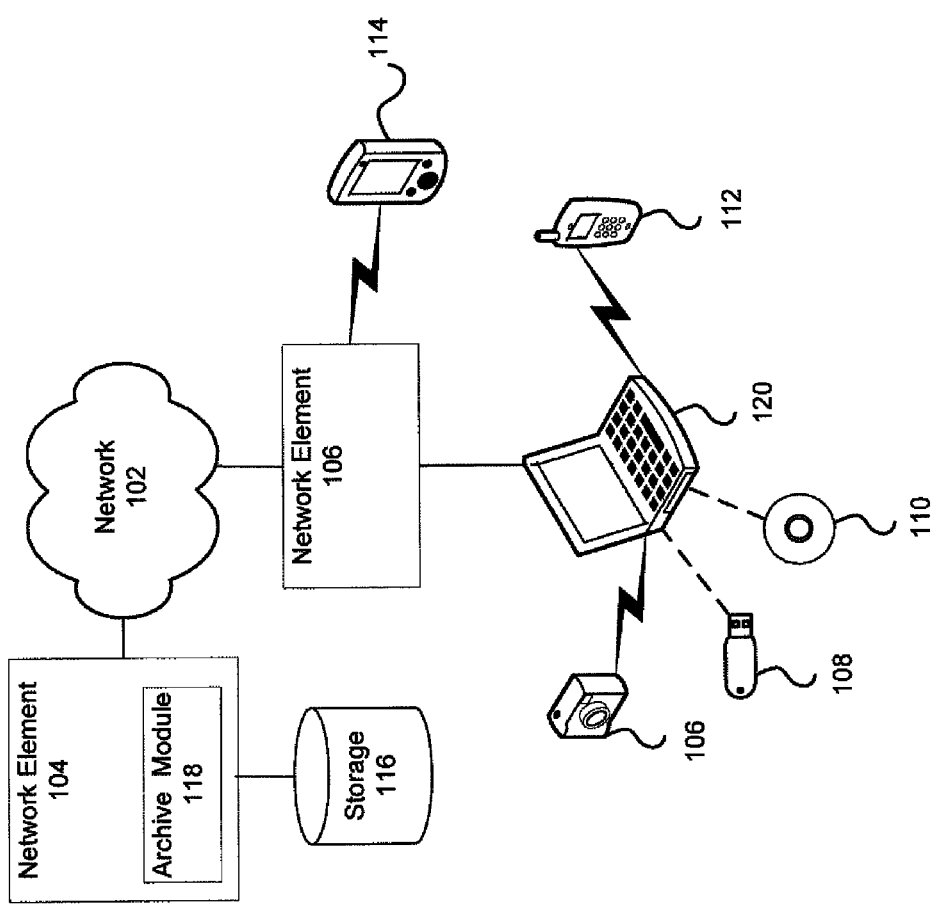
FIG. 1 shows a system for portable device data archiving in accordance with an embodiment of the present disclosure.

Referring to FIG. 1, there is shown a system 100 for portable device data archiving in accordance with an embodiment of the present disclosure. FIG. 1 is a simplified view of system 100, which may include additional elements that are not depicted. Network element 104 may be communicatively coupled to network 102. Network element 104 may contain archive module 118. Storage 116 may be communicatively coupled to network element 104. Device 114 may be a smartphone, PDA, or another device coupled via a wireless or wired connection to network element 106. Computer 120 may be communicatively coupled to network 102 via network element 106. One or more devices may be communicatively coupled to computer 120 such as, for example, digital camera 106, flash memory device 108, and cell phone 112. Computer 120 may also interface with and/or access storage media such as, for example, optical storage media 110.

Network 102 may be a local area network (LAN), a wide area network (WAN), the Internet, a cellular network, a satellite network, or another network that permits communication between network elements 104 and 106, computer 120 and other devices communicatively coupled to network 102. Network 102 may further include one, or any number, of the exemplary types of networks mentioned above operating as a stand-alone network or in cooperation with each other. Network 102 may utilize one or more protocols of one or more network elements to which it is communicatively coupled. Network 102 may translate to or from one or more protocols of network devices or to other protocols. Although network 102 is depicted as one network, it should be appreciated that according to one or more embodiments, network 102 may comprise a plurality of interconnected networks.

Storage 116 may be network accessible storage and may be local, remote, or a combination thereof to network elements 104 and 106. Storage 116 may utilize a tape, disk, a storage area network (SAN), or other computer accessible storage. Storage 116 may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage 116 may be used for archival purposes.

Network element 104 may be an application server, archival platform, backup server, network storage device, media server, email server, document management platform, enterprise search server, or other device communicatively coupled to network 102. Network element 104 may utilize storage 116 for the storage of application data, backup data, or other data. Network element 104 may be a host, such as an application server, which may process data traveling between network element 104 and a data archival platform, an archival process, and/or storage. According to some embodiments, network element 104 may be a platform used for archiving data. One or more portions of data may be archived based on an archival policy applied, attributes associated with the data source, space available for archive, space available at the data source, or other factors.

Computer 120 may be a desktop computer, a laptop computer, a server, or other computer. Computer 120 may receive data from user input, a database, a file, a web service, and/or an application programming interface. Computer 120 may detect the connection of a device using an architecture such as, for example, a hot-pluggable architecture, a plug and play architecture, a hot swappable architecture, and a Hardware Abstraction Layer (HAL). For example, computer 120 may support one or more interfaces including, but not limited to, a Universal Serial Bus (USB) connection, a firewire connection, a wireless connection, a Bluetooth connection, a memory card interface, and a storage media interface. For example, if a device, such as flash memory device 108, is connected to computer 120 through an interface (e.g., via insertion in a USB port), a hot-pluggable architecture of computer 120 may allow computer 120 to recognize flash memory device 108. Computer 120 may recognize devices using other architectures or interfaces. For example, if cell phone 112 or digital camera 106 connect to computer 120 via Bluetooth or another wireless interface, computer 120 may recognize the devices. Additionally, computer 120 may recognize the insertion of storage media such as for example, optical storage media 110 (e.g., via an autorun.inf file contained on optical storage media 110). Computer 120 may recognize the connection of other devices including, but not limited to, a game device, a Personal Digital Assistant (PDA), a portable media player, an e-book reader, storage media, and an external storage device. According to some embodiments, computer 120 may detect attachment of a device upon the device's connection (e.g., via a hot-pluggable architecture). According to some embodiments, computer 120 may recognize a device upon reboot of computer 120 (e.g., a Plug and Play (PnP) device that is not hot-pluggable).

Computer 120 may contain an archive agent, a process, or a module that receives messages or monitors interfaces for the connection of a device. The archive agent may identify a connected device, determine one or more archive parameters associated with the device, and archive one or more portions of data on the device. For example, an archive agent may determine that a USB device has been connected by monitoring Hotplug events, hardware events, device manager events, and/or devfs (a device file system). The archive agent, process, or module may attempt to identify a connected device. For example, an archive agent running on computer 120 may look for an identifier such as a Plug and Play Device ID associated with the connected device, a volume serial number associated with the connected device, a PIN associated with the connected device, a Media Access Control (MAC) address, and/or an administrator assigned unique identifier. The archive agent, process, or module may use Windows Management Instrumentation (WMI) or an operating system device driver interface to access an identifier.

If an identifier is not found, the archive agent may perform one or more actions which may be configurable. The archive agent may ignore a detected device for which an identifier has not been found, the archive agent may use default archive parameters for the detected device, and/or the archive agent may query another component for parameters or more information. For example, the archive agent may query a centralized archiving process or module, such as archive module 118. Archive module 118 may provide default archive parameters based on a device type or other information provided by the archive agent. Archive module 118 may also provide instructions to allow the archive agent to obtain an identifier. For example, connection of a smartphone via Bluetooth may be detected by an archive agent, but the archive agent may not obtain an identifier. The archive agent may receive information from archive module 118 allowing the archive agent to access an identifier, such as information allowing access via an API to a smartphone identifier and/or other data. In other embodiments, the archive agent may use default archive parameters to archive data from the connected device without obtaining an identifier. Default archive parameters may be stored on computer 120, obtained from archive module 118, or otherwise obtained by an archive agent.

According to some embodiments, an archive agent running on computer 120 may obtain one or more archive parameters after finding an identifier. Archive parameters may include a specified archive repository, a retention category, an indication of one or more portions of a connected device to be archived, an archive policy indicator, a keyword to be associated with archived data, a tag to be associated with archived data, a checksum associated with data previously archived, and/or a hash value associated with data previously archived. Archive parameters may be located on the device connected to computer 120, on computer 120, or stored centrally. For example, an archive agent running on computer 120 may detect connection of a device, obtain an identifier of the device, and use the identifier to query one or more archive parameters from archive module 118.

According to some embodiments, if an archive agent on computer 120 is unable to locate an identifier for a connected device and/or an archive parameter, an archive user interface may be launched. The archive user interface may prompt a user for device identification and one or more archive parameters. The archive user interface may be a graphical user interface such as a "wizard" which may guide a user through one or more steps to provide device identification and archive parameters. The archive user interface may allow a user to specify a desired archive repository, one or more portions of information to be archived (e.g., archive my contacts from my smartphone, or directories a, b, and e from a storage device), a retention period, and/or other archive parameters. According to some embodiments, a user may provide identifying information for a device and archive parameters may be provided by a policy. For example, a device may be identified as a company issued smartphone which was issued to an executive officer of the company. Based on the this information, an archive policy may be identified which may specify the archive repository, the portions of data to be archived, the retention period, and/or other archive parameters.

According to some embodiments, an administrator, a network service provider, a device reseller, or other parties may distribute a device with an identifier and/or one or more archive parameters located on the device. For example, an administrator of a company may distribute cell phones, storage devices, or other devices with an identifier stored on the device and with archive parameters for the device already preconfigured. The archive parameters may be stored on the device and/or may be stored on a location that is network accessible to computer 120. In one or more embodiments, some archive parameters may be specified only by an administrator and some may be selected by a user. For example, an administrator may specify an archive repository to be used for archive data of a device. A user of the device may specify one or more additional archive parameters (e.g., retention category) but may not change the archive repository.

After identification of a connected device, an archive agent on computer 120 may archive one or more portions of data on the connected device. An archive process of computer 120 may generate one or more hash values or checksums to indicate data that has been archived. According to some embodiments, an archive process of computer 120 may use a hash value or a checksum to determine whether the data has changed since a prior archive. If a hash value or checksum has not changed, data may not be archived.

Network element 106 may be a router, a broadband gateway, or another device providing network connectivity between network 102 and computer 120. According to some embodiments, network element 106 may be a broadband router which may provide wireless and/or wired connectivity for a local LAN side and may connect to network 102 via a cable network, a telephone network, or a fiber optic connection. Network element 106 may be capable of detecting a connection of one or more devices connected to a LAN interface provided by it (e.g., a wireless connection made by device 114, or via a wired connection). For example, network element 106 may use Universal Plug and Play (UPnP) to detect a connection of a device. According to some embodiments, computer 120 may connect directly to network 102.

According to some embodiments, network element 106 may contain an archive agent, process, or module. The archive agent may detect connection of a device such as device 114 using Universal Plug and Play (UPnP). Device 114 may be a smartphone, a PDA, or other device connecting via a Bluetooth, wireless, or wired interface. The archive agent may obtain an identifier associated with device 114 and/or one or more archive parameters. The archive agent may then archive one or more portions of data on device 114.

Figure 2:
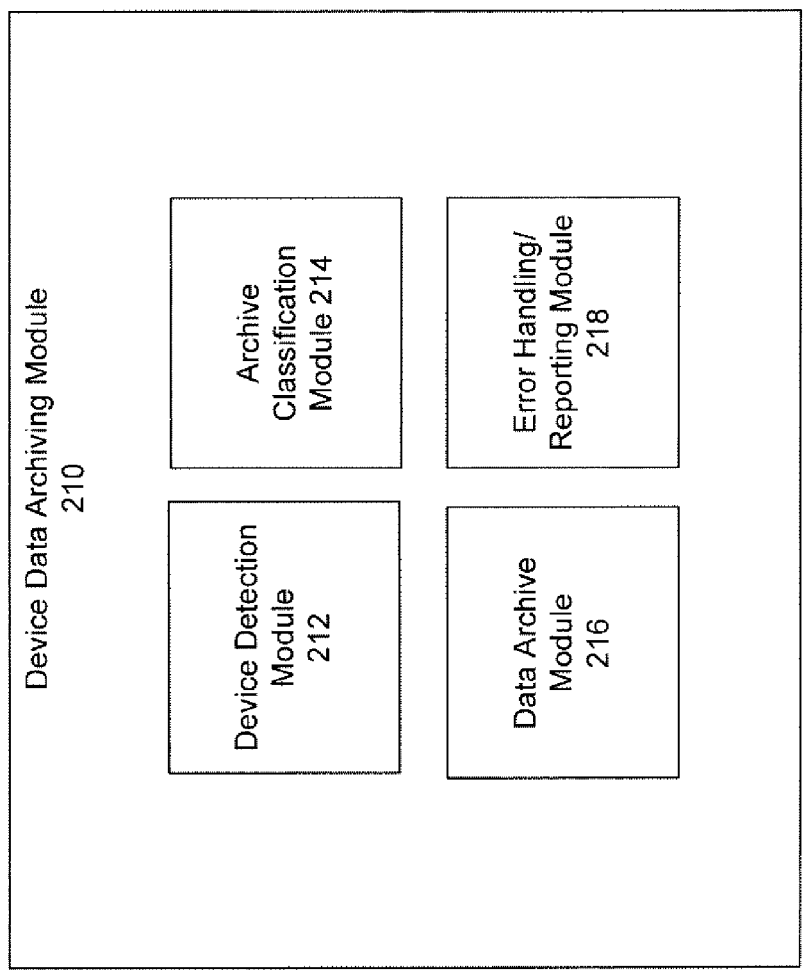
FIG. 2 shows a module for portable device data archiving in accordance with an embodiment of the present disclosure.

Referring to FIG. 2, there is shown a device data archiving module 210 in accordance with an embodiment of the present disclosure. As illustrated, the device data archiving module 210 may contain one or more components including a device detection module 212, archive classification module 214, a data archive module 216, and an error handling/reporting module 218.

The description below describes network elements, computers, and/or components of a system and method for portable device data archiving that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in two or more devices.

Device detection module 212 may detect the connection of a device to a computing platform. For example, device detection module 212 may run as an agent on a computing platform or receive messages from a computing platform (e.g., SNMP messages). Device detection module 212 may monitor Hotplug events, hardware events, device manager events, and/or devfs (a device file system). Device detection module 212 may use one or more components of a computing platform to monitor for the connection of devices such as, for example, a hot-pluggable architecture, a plug and play architecture, a hot swappable architecture, and a Hardware Abstraction Layer (HAL). Upon detection of a device or detection of the addition of storage media, device detection module 212 may pass one or more portions of device data to archive classification module 214.

Archive classification module 214 may receive or identify a device identifier and/or one or more archive parameters. Archive classification module 214 may look for an identifier such as a Plug and Play Device ID associated with the connected device, a volume serial number associated with the connected device, a PIN associated with the connected device, a Media Access Control (MAC) address, and/or an administrator assigned unique identifier. Archive classification module 214 may use Windows Management Instrumentation (WMI) to access an identifier.

Archive classification module 214 may receive, retrieve, or specify one or more archive parameters after finding an identifier. Archive parameters may include a archive repository, a retention category, an indication of one or more portions of a connected device to be archived, an archive policy indicator, a keyword to be associated with archived data, a tag to be associated with archived data, a checksum associated with data previously archived, and/or a hash value associated with data previously archived. Archive parameters may be located on the device containing data being archived, on a computing platform to which the archived device is connected, or stored centrally. Archive classification module 214 may use one or more default archive parameters. Archive classification module 214 may identify an archive policy based on a device identifier, a device type, an associated user, an associated group, and/or one or more specified archive parameters.

Data archive module 216 may archive data of one or more portable devices. Data archive module 216 may receive a device identifier and one or more archive parameters from archive classification module 214. According to some embodiments, data to be archived from a portable device may depend on one or more factors. For example, archive parameters may be specified by a user of the device, an administrator providing the device, or another entity, which specify what data to be archived. Archival of data may depend on data type, data location, or other data attributes. For example, an administrator may specify that data types associated with music or game files are not to be archived. According to some embodiments, a hash value or checksum may be used to determine whether a portion of data has previously been archived. If the data has previously been archived, archival of the data may be skipped.

Error handling/reporting module 218 may handle errors associated with device identification, data archival, and other processes. Error handling/reporting module 218 may log errors, such as errors occurring during archiving. Error handling/reporting module 218 may provide reports or logs of errors. According to some embodiments, error handling/reporting module 218 may contain logs identifying data (e.g., file names, directory names, file sizes) that was recognized on a portable device but not archived.

Figure 3:
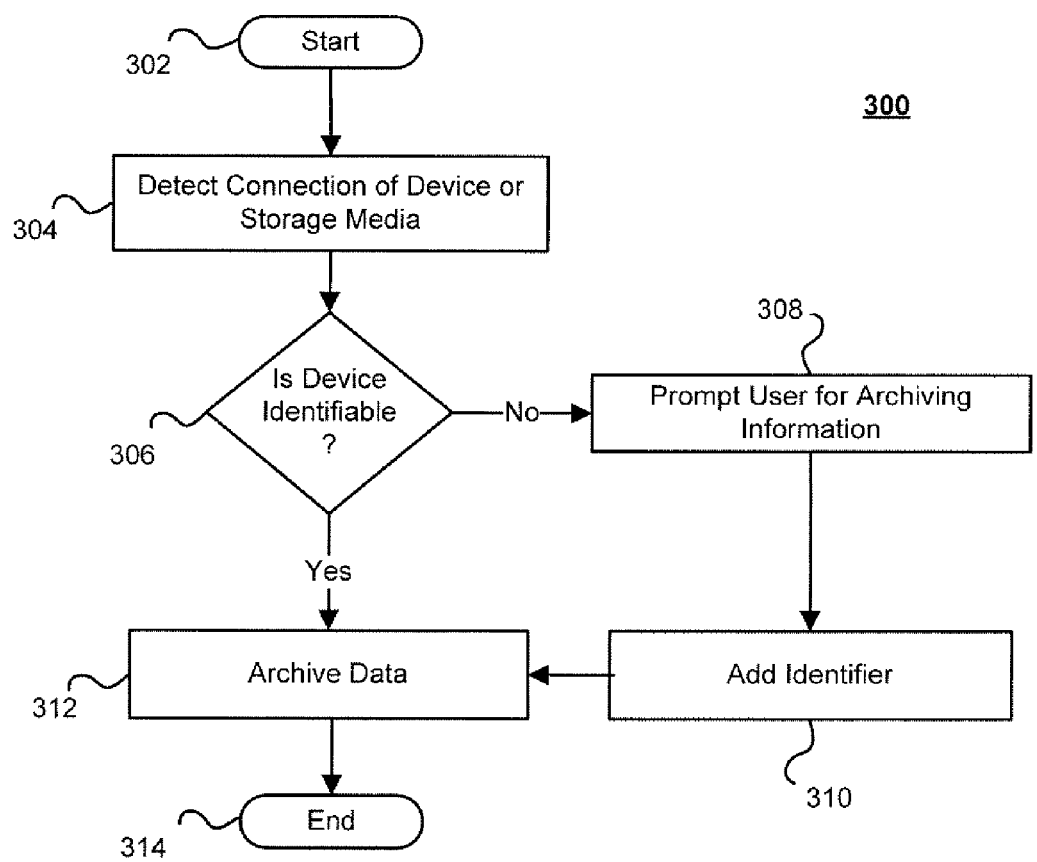
FIG. 3 depicts a method for portable device data archiving in accordance with an embodiment of the present disclosure.

Referring to FIG. 3, there is depicted a method 300 for portable device data archiving in accordance with an embodiment of the present disclosure. At block 302, the method 300 may begin.

At block 304, connection of a device or storage media may be detected. Interfaces such as USB, firewire, WiFi, and Bluetooth may be monitored. According to some embodiments, a device driver manager may be monitored for device events or device events may be received from a device driver manager. Addition of storage such as optical storage, disk based storage, and/or a flash memory device may also be detected.

At block 306, it may be determined whether a device is identifiable. The method 300 may look for an identifier such as a Plug and Play Device ID associated with the connected device, a volume serial number associated with the connected device, a PIN associated with the connected device, a Media Access Control (MAC) address, and/or an administrator assigned unique identifier. The method 300 may use Windows Management Instrumentation (WMI) or an operating system device driver interface to access an identifier. If the device is identifiable, the method 300 may continue at block 312. If the device is not identifiable, the method 300 may continue at block 308.

At block 308, a user may be prompted for archival information. An archive user interface may prompt a user for device identification and/or one or more archive parameters. The archive user interface may be a graphical user interface such as a "wizard" which may guide a user through one or more steps to provide device identification and archive parameters. The archive user interface may allow a user to specify a desired archive repository, one or more portions of information to be archived, a retention period, and/or other archive parameters. According to one or more embodiments, a portion of archive parameters may be set by an administrator only. For example, an administrator may specify an archive repository to be used and a user may specify one or more additional parameters. According to some embodiments, a user may provide identifying information for a device and archive parameters may be provided by a policy.

At block 310, according to some embodiments, an identifier may be added to a connected device. The identifier may be generated, provided by an administrator, or otherwise obtained. A user may also provide a unique identifier. According to some embodiments, data may be archived using received archive parameters and an identifier may not be used.

At block 312, data may be archived. Archival of data may be performed in accordance with specified archive parameters. According to some embodiments, an archive process, agent, or module may use a checksum, a hash value, or another indicator to determine whether or not data should be archived. A hash value may be generated to compare against a prior hash value to determine whether data has changed since a last archival. If data has not previously been archived or if data has changed, the data may be archived.

At block 314, the method 300 may end.

At this point it should be noted that portable device data archiving in accordance with the present disclosure as described above typically involves the processing of input data and the generation of output data to some extent. This input data processing and output data generation may be implemented in hardware or software. For example, specific electronic components may be employed in an archive module or similar or related circuitry for implementing the functions associated with portable device data archiving in accordance with the present disclosure as described above. Alternatively, one or more processors operating in accordance with instructions may implement the functions associated with portable device data archiving in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for data archiving comprising:
    detecting, using at least one computer processor, a connection of a device to a computing platform;
    identifying the connected device; and
    archiving data of the connected device according to a specified archive parameter, wherein the specified archive parameter is stored on a central network accessible location and associated with an identifier of the connected device, and wherein the specified archive parameter comprises a hash value associated with data previously archived, wherein the central network accessible location is a location separate from a location of the computing platform.

2. The computer implemented method of claim 1, wherein identifying the connected device comprises prompting a user for device identification and one or more archive parameters.

3. The computer implemented method of claim 2, wherein prompting a user for device identification and one or more archive parameters comprises providing a graphical user interface guiding a user through entry of archive information for the connected device.

4. The computer implemented method of claim 1, wherein identifying the connected device comprises using an identifier stored on the connected device.

5. The computer implemented method of claim 4, wherein the identifier is stored on the connected device prior to distribution to a user.

6. The computer implemented method of claim 4, wherein the identifier comprises at least one of: a Plug and Play Device ID associated with the connected device, a volume serial number associated with the connected device, a PIN associated with the connected device, a Media Access Control (MAC) address, and an administrator assigned unique identifier.

7. The computer implemented method of claim 1, wherein the specified archive parameter further comprises at least one of: a specified archive repository, a retention category, an indication of one or more portions of a connected device to be archived, an archive policy indicator, a keyword to be associated with archived data, a tag to be associated with archived data, and a checksum associated with data previously archived.

8. The computer implemented method of claim 1, wherein the specified archive parameter further comprises a default archive parameter.

9. The computer implemented method of claim 1, wherein detecting connection of a device to a computing platform is performed at least in part using at least one architecture of the computing platform comprising: a hot-pluggable architecture, a plug and play architecture, a hot swappable architecture, a universal plug and play architecture, and a Hardware Abstraction Layer (HAL).

10. The computer implemented method of claim 1, wherein the connected device connection comprises at least one of: a Universal Serial Bus (USB) connection, a firewire connection, a wireless connection, a Bluetooth connection, a memory card interface, and a storage media interface.

11. The computer implemented method of claim 1, wherein the connected device comprises at least one of: a digital camera, a cellular phone, a flash memory device, a game device, a Personal Digital Assistant (PDA), a portable media player, an e-book reader, storage media, and an external storage device.

12. The computer implemented method of claim 1, wherein detecting a connection of a device to a computing platform comprises detection of a networked device using universal plug and play.

13. The computer implemented method of claim 12, wherein the computing platform comprises a broadband router.

14. The computer implemented method of claim 1, wherein the specified archive parameter is stored on the connected device.

15. The computer implemented method of claim 1, wherein identifying the connected device comprises determining whether the connected device contains an identifier.

16. The computer implemented method of claim 15, further comprising skipping archival of data of the connected device in the event the connected device does not contain the identifier.

17. At least one non-transitory processor readable storage medium for storing a computer program of instructions configured to be readable by at least one processor for instructing the at least one processor to execute a computer process for performing the method as recited in claim 1.

18. A non-transitory article of manufacture for data archiving, the article of manufacture comprising:
    at least one processor readable storage medium; and
    instructions carried on the at least one storage medium;
    wherein the instructions are configured to be readable from the at least one medium by at least one processor and thereby cause the at least one processor to operate so as to:
    detect a connection of a device to a computing platform;
    identify the connected device; and
    archive data of the connected device according to a specified archive parameter, wherein the specified archive parameter is stored on a central network accessible location and associated with an identifier of the connected device, and wherein the specified archive parameter comprises a hash value associated with data previously archived, wherein the central network accessible location is a location separate from a location of the computing platform.

19. A system for data archiving comprising:
one or more processors communicatively coupled to a network; wherein the one or more processors are configured to:
detect a connection of a device to a computing platform;
identify the connected device; and
archive data of the connected device according to a specified archive parameter, wherein the specified archive parameter is stored on a central network accessible location and associated with an identifier of the connected device, and wherein the specified archive parameter comprises a hash value associated with data previously archived, wherein the central network accessible location is a location separate from a location of the computing platform.

* * * * *